United States Patent [19]

Carlsson

[11] Patent Number: 4,795,566
[45] Date of Patent: Jan. 3, 1989

[54] METHOD FOR CLEANSING A CONTAMINATED MEDIUM IN A CONTACT REACTOR

[75] Inventor: Kurt Carlsson, Växjö, Sweden

[73] Assignee: Fläkt AB, Nacka, Sweden

[21] Appl. No.: 798,635

[22] Filed: Nov. 15, 1985

[30] Foreign Application Priority Data

Nov. 29, 1984 [SE] Sweden ............................. 8406033

[51] Int. Cl.$^4$ ............................................. B01D 53/14
[52] U.S. Cl. ........................................ 210/675; 55/74
[58] Field of Search .................. 55/71, 73, 74, 77–79, 55/387, 390; 210/670, 675, 189, 268, 269, 270, 282

[56] References Cited

U.S. PATENT DOCUMENTS 2,087,157 7/1937 Lind ..................................... 210/189
4,552,732 11/1985 Hillekamp ............................ 55/390

FOREIGN PATENT DOCUMENTS 422890 4/1976 Sweden.
941618 11/1963 United Kingdom.

Primary Examiner—Ivars Cintins
Attorney, Agent, or Firm—Burns, Doane, Swecker & Mathis

[57] ABSTRACT

The invention relates to a method and an arrangement for enabling a contaminated medium to be cleansed in a contact reactor by introducing thereinto a pulverulent absorption material capable of reacting with contaminants in the medium, the medium and the absorption material being mixed together in the contact reactor over a period of time in which contaminants react with the material, therewith to absorb on and react with individual particles in the pulverulent absorption material.

The method includes the steps of:
(a) removing absorption material partly reacted with contaminants downstream of the contact reactor;
(b) storing this removed absorption material for a pre-determined time duration in excess of 20 hours;
(c) causing the contaminants to diffuse inwardly into respective individual particles during this storage time, thus to impart to the surfaces of the particles an increased ability to absorb further contaminants; and
(d) returning stored, previously used absorption material to the contact reactor as a pulverulent absorption material capable of reacting with the contaminants contained in the medium.

3 Claims, 1 Drawing Sheet

METHOD FOR CLEANSING A CONTAMINATED MEDIUM IN A CONTACT REACTOR

TECHNICAL FIELD

The present invention relates to a method for cleansing a contaminated medium in a contact reactor, by introducing thereinto a pulverulent absorbent which reacts with the contaminating substances, the medium and absorbent being mixed with one another in the reactor over a period of time sufficient for the contaminating substances to react with the absorbent, such that said substances are absorbed by and adhere to the discrete particles of the pulverulent absorbent.

The invention also relates to an arrangement by means of which a contaminated medium can be cleansed in a contact reactor vessel, by introducing into the vessel a pulverulent absorbent which reacts with the contaminants in the medium, and by causing the contaminated medium and the absorbent to mix with one another for a period of time sufficient for the aforesaid reaction to take place, such that the contaminants absorb on and adhere to the discrete particles of the pulverulent absorbent.

BACKGROUND PRIOR ART

It is known that so-called "acid gases", i.e. gaseous media containing acid forming substances such as sulphur dioxide, hydrogen chloride and the like, can be cleansed of their acid constituents, by washing such gases with water containing alkaline components. Although this method provides good results, however, it is encumbered with high investment costs and the apparatus required to carry out the method must be carefully maintained.

It is also known to provide such apparatus with advanced water and sludge treatment auxiliaries, otherwise it would be immediately ascertained that an air contaminant has transformed to a water contaminant.

One reason for the high investment costs incurred is that the whole purification plant must be constructed from high-grade stainless steel, since acidiferous aqueous solutions are extremely aggressive.

It is also known to employ so-called "semi-dry" purification systems or "fully dry" purification systems, in an attempt to eliminate the aforesaid drawbacks.

In methods used in conjunction with such purification plants there is injected into the acidic medium a pulverulent absorbent which presents a large specific surface area and which is reactive with the acid components of the medium, e.g. a flue gas, so that the acid components as a result of this reaction adhere to and absorb on the discrete particles of the pulverulent absorbent. The absorbent material carrying the contaminants can then readily be separated from the medium by conventional methodology, with the aid of electrostatic separators and/or fabric filters.

It is well known that these dry purification systems functioning by absorption afford many advantages compared with known wet separation methods, inter alia because the contaminated medium, flue gases, is treated with a dry absorbent and at high temperatures. The use of a dry absorbent in hot flue gases has enabled standard constructional steel to be used in the construction of the plant apparatus required. This has greatly reduced construction costs.

Maintenance costs, personnel costs and running costs are also lower when practicing this latter type of purification methodology.

It has been found, however, that the reaction between an acid gas component, for example gaseous hydrogen chloride, and a dry solid particle, for example slaked lime $Ca(OH)_2$, is not as effective as the reaction between hydrogen chloride gas and a basic water droplet.

It has also been established that in a dry purification system reactivity can be enhanced by decreasing the particle size of the dry particles. This renders the absorbent more expensive however.

The arrangements and methods described and illustrated in
(a) British Patent Specification No. 941 618, and
(b) Swedish Patent Specification No. 422 890
also form part of the prior art.

The British Specification No. 941 618 describes and illustrates a plant in which fresh reactant is mixed with varying amounts of previously used and thus reacted material. Although this latter material is said to be taken from a silo, the specification makes no mention of any specific length of time over which the reacted material shall be stored in the silo.

The sole purpose of this storage silo is one of smoothing out variations in material flow due to fluctuations in operation, start and stop, and to disturbances which result in losses of material.

The Swedish Patent Specification No. 422 890 describes and illustrates a plant of principally similar operational features with regard to the storage and recycling of reactants which have previously undergone a reaction, similar to the aforesaid British Patent Specification.

DISCLOSURE OF THE PRESENT INVENTION

Technical Problem

When reviewing the present state of this art as expressed in the aforegoing it will be seen that one qualified technical problem resides in the provision of ways and means which will enable a coarse-grain, and therewith less expensive pulverulent, reactive absorbent to be used to the same good effect as a fine-grain, and therewith more expensive absorbent.

A further technical problem is one of enabling substantially the full absorbing capacity of the absorbent to be used, and not solely the exposable surface portions of the separate particles constituting the absorbent.

Another technical problem is one of providing means which enable the full absorbing capacity of the absorbent to be utilized irrespective of prevailing particle sizes and particle distribution, by enabling utilized absorbent to be recycled repeatedly over a relatively long period of time.

Another technical problem is one of providing ways and means which enable the absorbing capacity of the dry absorbent material to be utilized to an extent greater than 50%.

Another qualified technical problem in this respect is one of providing means with which the absorption capacity of consumed absorbent partly can be restored without requiring large structural modification to existing plants.

Still another technical problem in the present context is one of ensuring that the recycled, restored absorbent particles have an absorptive, reactive capacity corresponding to 40–80% of their previous absorption capacity.

Solution

The present invention relates to a method which enables a contamined medium to be cleansed in a contact reactor, by introducing into the reactor a pulverulent absorption material which reacts with the contaminant substances in said medium, and in which method the medium and absorbent are mixed with one another in the reactor over a period of time sufficient for the contaminants to react with the absorbent such as to absorb on and react with the discrete particles of the pulverulent material.

The method according to the invention comprises;
(a) removing downstream of the contact reactor all or a part of the absorbent which has partly reacted with the contaminants;
(b) storing all or part of the said removed material for a period of time in excess of 20 hours;
(c) causing the contaminants to diffuse inwardly into the individual particles during this storage period, thus increasing the absorption ability of the particle surface; and
(d) charging the thus stored, previously used absorbent to the contact reactor in the form of a pulverulent absorbent material capable of reacting with contaminants present in the medium.

In accordance with one suitable embodiment of the invention the reactive material charged to the contact reactor comprises a mixture of unused pulverulent absorbent, and stored, absorbent material that has previously partly reacted with contaminants. The mixing ratio between used absorbent and stored, previously unused absorbent preferably lies within the range of 0.2–0.5.

The aforementioned given storage time is conveniently chosen in dependence on the powder form and size of the absorbent material, normally a time period shorter than 100 hours. In the case of large particle size, the storage time is longer than for smaller particle sizes. In the case of a particle size of about 10 $\mu$m the storage or stay time is conveniently longer than 20 hours but shorter than 40 hours. The rate of diffusion is temperature dependent; for reasons of energy economy, however, temperatures should not exceed 100° C. The time constant for the aforesaid equalizing process is about 10 hours at 70°–80° C. in respect of particles of about 10 $\mu$m. The recycled particles shall also have the ability of absorbing contaminants to an extent corresponding to 40–80% of their previous absorption ability.

The invention also relates to an arrangement for enabling a contaminated medium to be cleansed in a contact reactor, by introducing into the reactor a pulverulent material capable of reacting with the contaminants in said medium, in which arrangement means are provided for mixing the absorbent with the contaminated medium over a period of time which enables the contaminants to react with the absorbent, so that said contaminants absorb on and react with discrete particles in the pulverulent material.

The arrangement according to the invention is adapted to enable all or a part of the used absorbent material in said medium to be removed from the gas in the contact reactor downstream thereof. The removed absorbent partly reacted with said contaminants, or a part of that absorbent, is then stored in a storage vessel or silo over a given period of time in excess of 20 hours. The period of time allotted in this respect shall be sufficient to enable contaminants to diffuse inwardly into the discrete particles, the absorptive qualities of said particles thus being restored in part for the subsequent absorption of further contaminants. Means are provided for returning the stored, previously used absorbent to the contact reactor for re-use as a pulverulent material capable of reacting with contaminants carried by said medium.

In accordance with the invention means are provided for preparing an absorbent mixture comprising unused pulverulent absorbent and stored, absorbent which has previously been reacted with used contaminants and subsequently partly been restored. The mixing ratio between unused absorbent and restored absorbent is controlled through the agency of a metering device adapted to this end.

In accordance with one advantageous embodiment of the invention, the contact reactor is connected to one or more downstream dust separators, and means are provided for feeding dust particles extracted in said dust separators to a first particle feed means operating under pneumatic pressure.

Dust separated in the dust separator is arranged to be transferred to a storage silo or to a dumping silo.

Dust can be transferred to the reactor from the storage silo via a second powder-feed means, while new pulverulent absorbent material can be fed to the contact reactor via a third particle-feed means.

The pulverulent absorption material capable of reacting with the contaminants carried by the medium conveniently comprises one or more basic substances, such as powdered lime (slaked lime) or the like, suitable when the contaminants constitute acid gases, such as sulphur dioxide, hydrochlorid acid gas and the like.

Advantages

The advantages primarily afforded by the method and arrangement according to the present invention lie predominantly in the fact that the absorbent can be more effectively repeatedly used sustantially without needing to radically modify existing plant apparatus, while enabling an absorbent of larger particle size to be selected which gives a lower operating cost.

The primary characteristic features of a method for cleansing a contaminated medium in a contact reactor by introducing thereinto a pulverulent absorption material capable of effectively reacting with contaminants present in the medium are set forth in the characterizing clause of the following claim 1. The primary characterizing features of an arrangement for cleansing a contaminated medium in a contact reactor by introducing thereinto a pulverulent absorption material capable of effectively reacting with said contaminants are set forth in the chracterizing clause of the following claim 8.

BRIEF DESCRIPTION OF THE DRAWING

An exemplary embodiment having features characteristic of the present invention will now be described in more detail with reference to the accompanying drawing in which.

DESCRIPTION OF A KNOWN DRY FLUE-GAS PURIFICATION PLANT

Figure 1:
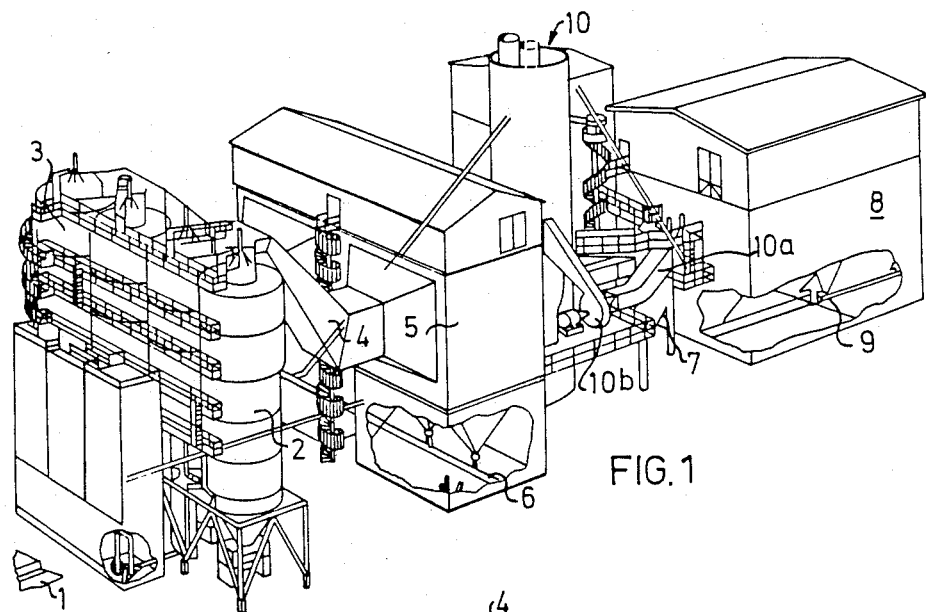
FIG. 1 is a perspective view of a dry flue-gas purification plant or principally known construction.

FIG. 1 illustrates a prior known plant for dry flue-gas purification.

Flue gases leave the boilers of a central boiler station (not shown in FIG. 1) at a temperature of about 180° C. and are passed firstly through a particle-separating cyclone. The cyclone is not shown in FIG. 1, but is arranged to separate heavy dust particles, therewith facilitating continued cleansing of the gases. The cyclone extracts about 50% of the dust particles present. The cyclone is referenced 31 in the FIG. 1 illustration.

Thus, flue gases which have partially been cleansed of solid dust particles arrive through a conduit 1 and are passed to two vertical contact reactors 2,3, where the flue gases are mixed with dry powdered lime through spray devices not shown. This results in a chemical reaction between the external surfaces of the powdered lime and the acid components in the flue gas, primarily hydrogen chloride, sulphur dioxide. Flue gases containing solid contaminants emanating from dust particles generated during combustion, together with lime particles, exhibiting surfaces that have partly reacted with acid components in the contact reactors 2 and 3, are passed through a duct/conduit 4 to an electrostatic precipitator 5.

Various designs of electrostatic precipitators are known to the art. The dust is removed from the bottom of the precipitator, through a transport conduit 6 provided therein.

The flue gases cleansed in the electrostatic precipitator 5 are transferred for fine-cleansing in a texile bag filter 8.

The bag filter 8 comprises a plurality of textile bags, in a manner known per se. The bag filter 8 is primarily adapted to collect extremely fine dust in a last stage. The fine dust extracted in the bag filter 8 is removed from the filter through a discharge system or transport conduit 9.

The thus cleansed flue gases are discharged through a flue stack 10 via a conduit/duct 10a, with the aid of a flue-gas fan 10b.

DESCRIPTION OF A PREFERRED EMBODIMENT

Figure 2:
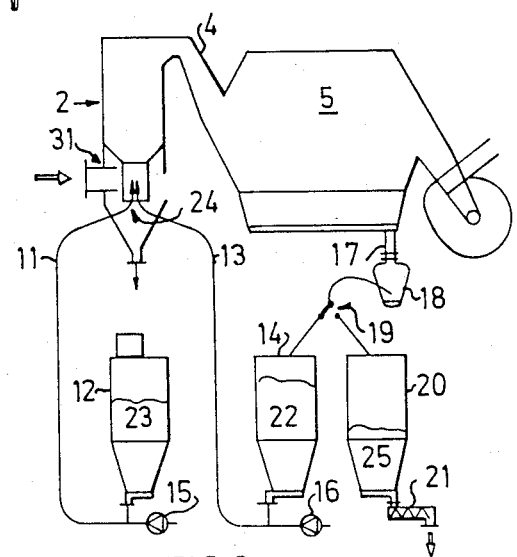
FIG. 2 illustrates schematically an arrangement according to the invention constituting a complement to the plant illustrated in FIG. 1.

As illustrated in FIG. 2 the present invention relates to an arrangement for enabling a contaminated medium passing through the conduit 1 to be cleansed in a contact reactor 2 or 3, by introducing thereinto a pulverulent material capable of reacting with the contaminants present in the medium. The reactive pulverulent material is supplied through a conduit 11 from a silo 12 containing fresh absorbent 23, and through a conduit 13 extending from an intermediate storage silo 14 for previously used absorbent 22.

It is known to transport pulverulent material with the aid of transport fans and compressed air, and hence the apparatus and devices required herefor will not be described in detail.

The medium and the absorbent are mixed with one another in the contact reactor 2,3 over a period of time sufficient for impurities to react with the material, so that the contaminants, in the form of acid gases, are absorbed on and react with the discrete particles of the absorbent.

The illustrated arrangement comprises a conduit 4 extending between the contact reactor 2 and the dust separator 5, and a conduit 17 which corresponds essentially to the conduit 6 of the FIG. 1 embodiment, in which dust separation the whole, or at least a major part of the absorption partly reacted with the contaminants can be removed from the gas stream and passed to a dust feeder 18. The dust feeder 18 feeds, in a manner known per se, the dust received thereby to the aforementioned intermediate storage silo 14 or to a dumping silo 20, via a switching device 19. The material 25 transferred to the dumping silo 20 is removed therefrom for dumping, by means of a transport device 21. The transport device 21 may advantageously incorporate dust-moistening means, preferably water-sprinkling means.

Dust is not transported to the dumping silo 20 until a high level allotted to the intermediate storage silo is exceeded.

That part of the used absorption material 22 passed to the intermediate storage silo 14 is arranged to be stored therein for a given period of time.

This storage period shall be of sufficient duration to enable the contaminants to diffuse into the discrete particles, thereby enhancing the ability of the particles to absorb additional contaminants.

The intermediate storage silo 14 shall be of the size which enables the acid components in the contaminant to diffuse inwardly into the discrete particles and migrate towards the centers thereof during the time period in which the used absorbent is stored in the silo, thereby to form fresh reacted surfaces. Subsequent to a desired intermediate storage time, the dust is metered and distributed into the flue gas, into which the newly regenerated surfaces of the dust absorb acid components. Longer periods are normally required for larger particle sizes.

In accordance with the invention, the recycled regenerated particles shall have an absorption capacity corresponding to 40–80% of their previous absorption capacity. By the absorption capacity it is meant that the maximum absorption ability of a particle should it be exposed in the contact reactor to a maximum quantity of contaminants or an above-maximum contaminant quantity. If this absorption capacity is set to 50%, this means that the particle surfaces are so large and so formed that 50% of the maximum number of atoms possible in the absorption process are able to absorb contaminants.

It has been found that when the average particle size of the absorption material is slightly greater than 10 μm and comprises slaked lime, and the acid constituents of the polluted medium are in the form of hydrogen chloride, the used absorbent should be stored in the silo or container 14 for a period at least 20 hours at a temperature below 100° C.

Practical tests and theoretical calculations indicate that the storage time should lie between 20–40 hours, and in all events not longer than 50 hours, provided that the temperature is not far beneath 100° C.

Diffusability falls off at lower temperatures and the aforesaid storage or stay times can be considered to apply for ingoing particle temperatures of between 40° C. and 100° C. The temperature falls but slightly over a storage period of 20–40 hours.

If e.g. the flue gas contains HCl as a contaminant, part of the surface located $Ca(OH)_2$ molecules in a particle react with HCl to form $CaCl_2$ while giving off water. During the time the particles are held in the silo, the chloride ions diffuse inwardly into the particles and the hydroxide ions migrate outwardly in a corresponding manner. If the absorption material is utilized in the reactor to 20% of its absorption capacity, the surfaces of the particles will be regenerated to 80% of their original activity upon the termination of a full diffusion process. When the particles are stored for from 20–40 hours, they can be regenerated to 40–80%, depending upon temperature and "particle size".

It will be understood that the invention is not restricted to the aforedescribed exemplifying embodiment, and that modifications can be made within the scope of the concept of the invention.

I claim:

1. A method for enabling a contaminated medium to be cleansed in a contact reactor, by introducing thereinto a pulverulent absorption material capable of reacting with the contaminants carried by the medium, and in which the medium and the absorption material are caused to mix with one another in the contact reactor over a period of time in which contaminants react with the material, so that contaminants absorb on and react with discrete particles in the pulverulent absorption material, including the steps of:
    (a) removing downstream of the contact reactor part of the absorption material which is discharged from the reactor;
    (b) storing said removed part over a given length of time in excess of 20 hours and at a predetermined temperature;
    (c) causing the contaminants to diffuse into the discrete particles over the storage period while at the predetermined temperature, so as to impart to the surfaces of the particles an increased ability to absorb further contaminants; and
    (d) charging to the contact reactor a mixture of unused absorption material capable of reacting with the contaminants carried by the medium and stored absorption material which has previously reacted with contaminants and which has a reduced but effective capacity to react with the contaminants carried by the medium.

2. A method according to claim 1, characterized in that the mixing ratio between a non-reacted absorption material and a stored absorption material lies in the range of 0.2–0.5.

3. A method according to claim 1, characterized by recycling to the contact reactor previously reacted particles having an absorption ability corresponding to 40–80% of their previous absorption ability.

* * * * *